(12) United States Patent
Chen et al.

(10) Patent No.: US 7,200,004 B2
(45) Date of Patent: Apr. 3, 2007

(54) LOADING AND UNLOADING MECHANISM FOR REMOVABLE POWER SUPPLY MODULES

(75) Inventors: Yun-Chen Chen, Hsin-Tien (TW); Tzung-Han Lee, Hsin-Tien (TW)

(73) Assignee: Zippy Technology Corp., Hsin-Tien City (TW)

( * ) Notice: Subject to any disclaimer, the term of this patent is extended or adjusted under 35 U.S.C. 154(b) by 103 days.

(21) Appl. No.: 11/123,105

(22) Filed: May 6, 2005

(65) Prior Publication Data
US 2006/0250777 A1 Nov. 9, 2006

(51) Int. Cl.
*G06F 1/16* (2006.01)

(52) U.S. Cl. .................. 361/686; 361/727; 439/347

(58) Field of Classification Search .................. 361/686
See application file for complete search history.

(56) References Cited

U.S. PATENT DOCUMENTS

| | | | |
|---|---|---|---|
| 5,199,892 A * | 4/1993 | Campbell et al. | 439/246 |
| 5,552,959 A * | 9/1996 | Penniman et al. | 361/686 |
| 5,915,985 A * | 6/1999 | Fabian et al. | 439/248 |
| 6,599,143 B1 * | 7/2003 | Chong et al. | 439/247 |
| 6,711,012 B1 * | 3/2004 | Medin et al. | 361/686 |
| 7,014,508 B2 * | 3/2006 | Tsai | 439/630 |

FOREIGN PATENT DOCUMENTS

| | | |
|---|---|---|
| TW | 302088 | 4/1997 |
| TW | 479925 | 3/2002 |

* cited by examiner

*Primary Examiner*—Anatoly Vortman
*Assistant Examiner*—Anthony Q. Edwards
(74) *Attorney, Agent, or Firm*—Birch, Stewart, Kolasch & Birch, LLP

(57) ABSTRACT

A loading and unloading mechanism adopted for use on removable power supply modules includes in one embodiment a connection plug installed on a removable power supply and a connection trough connected to a power supply circuit of a system end (such as a personal computer). Another embodiment includes a connection trough on a system end to be installed on a holding unit which is movable to adjust the position relative to the system end according to the size of the removable power supply so that the removable power supply can be fully loaded into the computer. The loading and unloading mechanism thus formed can be adapted for the removable power supply of varying sizes and specifications.

8 Claims, 6 Drawing Sheets

LOADING AND UNLOADING MECHANISM FOR REMOVABLE POWER SUPPLY MODULES

FIELD OF THE INVENTION

The present invention relates to a loading and unloading mechanism and particularly to a loading and unloading mechanism adopted for use on removable power supply modules.

BACKGROUND OF THE INVENTION

Power supply is an important element for normal and stable operation of personal computers (PCs) and peripheral devices thereof. The conventional PC power supply has two types of specifications, i.e. AT and ATX, to support different specifications of motherboards (depending on CPU specifications). Whatever the specification of the power supply, output of the power supply usually includes a plug containing a plurality of power output cords to be coupled with a power socket on a system end. Then electric power is delivered to the system end (for the motherboard and/or related peripheral devices).

As the PC generally is coupled with a plurality of peripheral devices, such as an optical disk burner (CD-R/RW). hard disks and various interfaces of selected functions, a suitable power supply is needed to support normal operations of these peripheral devices. When more peripheral devices are added, the power supply generally is upgraded to a larger capacity to avoid shortage of power supply. The power supply of a greater capacity generally has a greater dimension. Hence a desirable power supply not only has to support stable operation, also has to meet the requirements of product upgrade or repairs and maintenance. Hence to alter the size of the power supply without changing the dimension of the computer and make assembly and disassembly of the power supply easier are important issues in the design of power supply.

When the conventional power supply is removed for upgrade or repairs and maintenance, a lot of electric connectors have to be unplugged, such as power connectors on the motherboard, hard disks, optical disk drive and floppy disk drive. The operation is tedious and time-consuming. The connectors or power cords are easily damaged if a slight inadvertence occurs. Although some conventional power supplies adopt a removable design for the power output cords, namely the power output cord has an electric connector to be coupled with an electric output port of the power supply, a lot of disassembly and assembly operations for the power output cords are still required.

To remedy the aforesaid problems, a removable power supply module has been developed. For instance, R.O.C. Patent Publication No. 302088 entitled "Removable power supply module for industrial computers" discloses a loading and unloading mechanism which has a power switch and a power socket located independently outside the computer. But it still has to be coupled with the computer through a connector and a power cord.

R.O.C. Patent Publication No. 479925 entitled "Improved structure of the connection backboard of power supply" discloses a power supply which has a socket and legs that are interconnected. However, it does not explain how to fully load the power supply of different sizes into a computer.

SUMMARY OF THE INVENTION

Therefore the present invention aims to provide a loading and unloading mechanism for removable power supply modules that offers easier operation during alteration of a removable power supply.

According to an embodiment of the invention, the loading and unloading mechanism includes an electric connector which has a connection trough and a connection plug. The connection plug is located on a removable power supply to serve as an electric output port. The connection trough is connected electrically with the circuit of a system end (such as PC or a server host) to serve as an electric input port of the system end. By coupling the connection trough and the connection plug, the removable power supply can provide required electric power to the system end (including motherboard, hard disks, optical disk drive, floppy disk drive, and the like). The power supply can be replaced easily by loading and unloading the removable power supply.

According to the loading and unloading mechanism of the invention, the removable power supplies of different sizes and specifications can be replaced and fully loaded into the computer.

According to another embodiment of the invention, the connection trough on the system end is installed on a holding unit. The holding unit is movable, and its position on the system end can be adjusted according to the size of the removable power supply to fully load the removable power supply into the computer.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
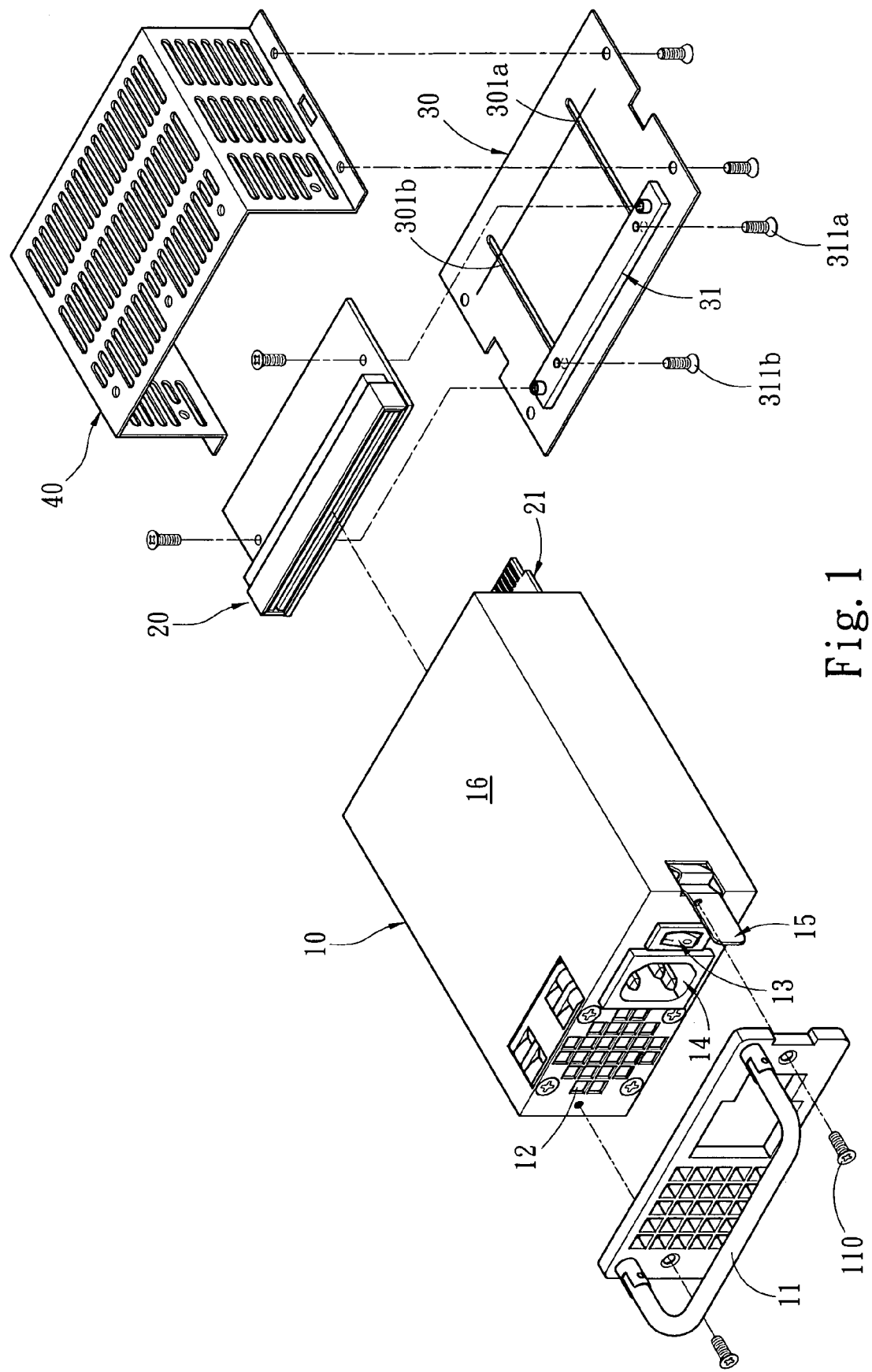
FIG. 1 is an exploded view of an embodiment of the present invention.

Please refer to FIG. 1 for an embodiment of the invention. The loading and unloading mechanism includes a removable power supply 10 which has a handle 11 to enable users to move, a radiation fan 12, a power switch 13, a socket 14 of external power cords and a movable latch member 15. The handle 11 is fastened to a case 16 of the removable power supply 10 through fastening elements 110 (such screws or the like). After the removable power supply 10 is loaded into a computer chassis (not shown in the drawings), the latch member 15 can latch on the computer chassis to prevent the removable power supply 10 from escaping. The latch member 15 may be released to unload the removable power supply 10 from the computer chassis.

According to another embodiment of the invention, the loading and unloading mechanism includes an electric connector and a holding unit.

The electric connector includes a connection trough 20 and a connection plug 21 which is fixedly installed on one end of removable power supply 10 to serve as an electric output port of the removable power supply 10. The connection trough 20 is connected to a power supply circuit of a system end (such as a PC or a server host). The power supply circuit includes circuits to provide required electric power to a motherboard, hard disks, an optical disk drive, a floppy disk drive, and the like. By coupling the connection tough 20 with the connection plug 21, the electric power required at the system end can be provided by the removable power supply 10. Replacing of the removable power supply 10 can be easily accomplished by unloading and reloading the removable power supply 10.

Figure 2:
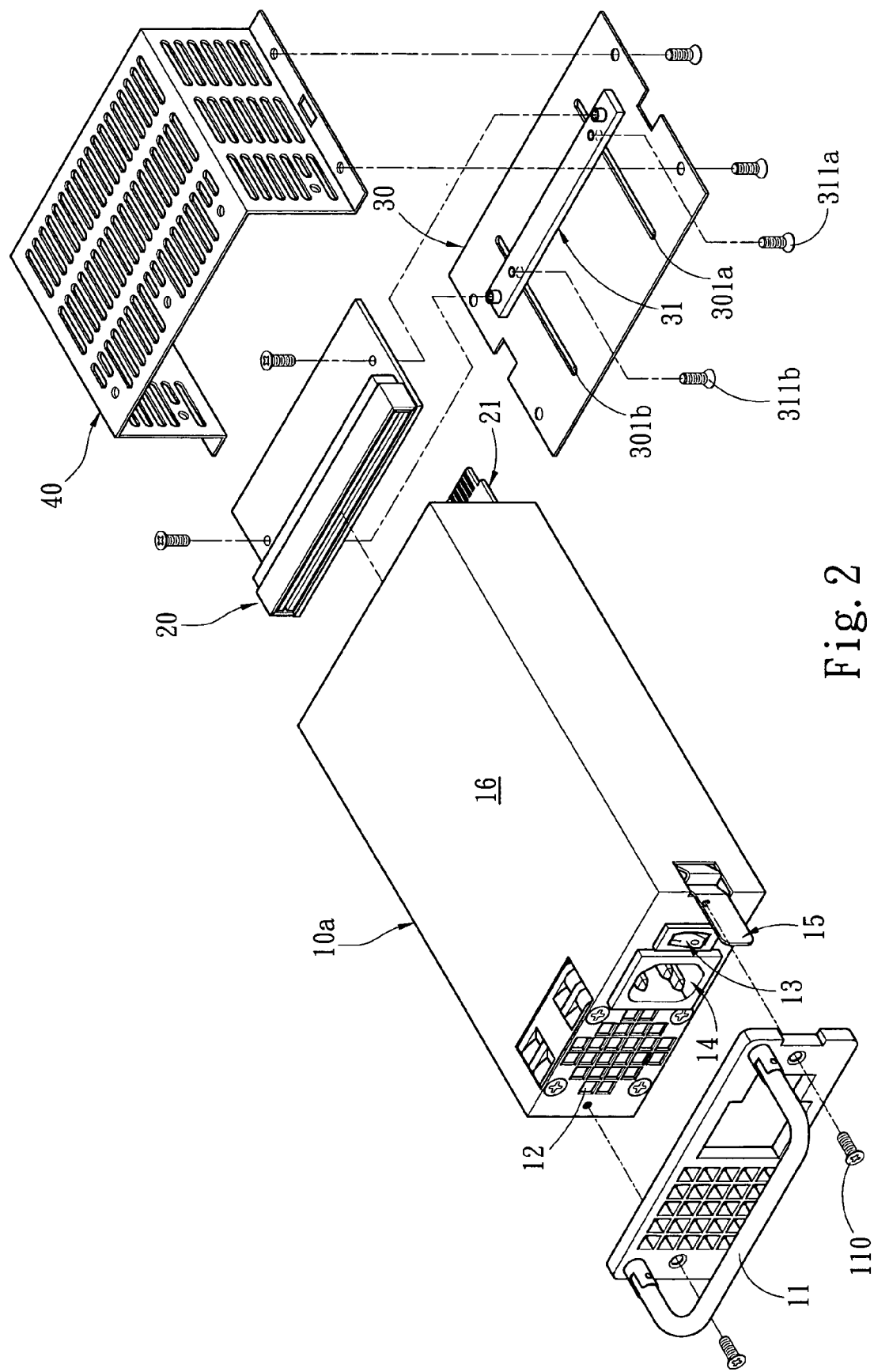
FIG. 2 is a schematic view of the present invention according to FIG. 1 in coupling operations.

The holding unit includes an anchor deck 30 and a sliding board 31 which is slidable on the surface of the anchor deck 30. The anchor deck 30 is fixedly mounted onto the computer chassis. The connection trough 20 is installed on the sliding board 31. As shown in the drawings, the anchor deck 30 is a flat board and has a track located thereon (may be a pair of parallel slots 301a and 301b). The sliding board 31 is coupled with the anchor deck 30 through the slots 301a and 301b via fastening elements (such as screws 311a and 311b). Hence for replacing the removable power supply 10a of a different size and specification (such as a larger one shown in FIG. 2), unfasten the screws 311a and 311b; move the sliding board 31 and the connection trough 20 to a desired location mating the size of the removable power supply 10a; fasten the screws 311a and 311b again. Then the position of the connection trough 20 relative to the computer chassis can be altered easily, and the removable power supply 10a can be fully loaded into the computer.

According to yet another embodiment of the invention, a guarding cover 40 is provided and mounted onto the anchor deck 30. It is preferably to cover the connection trough 20 and the connection plug 21 that are coupled together to guard against hitting resulting from external forces or objects.

Figure 3:
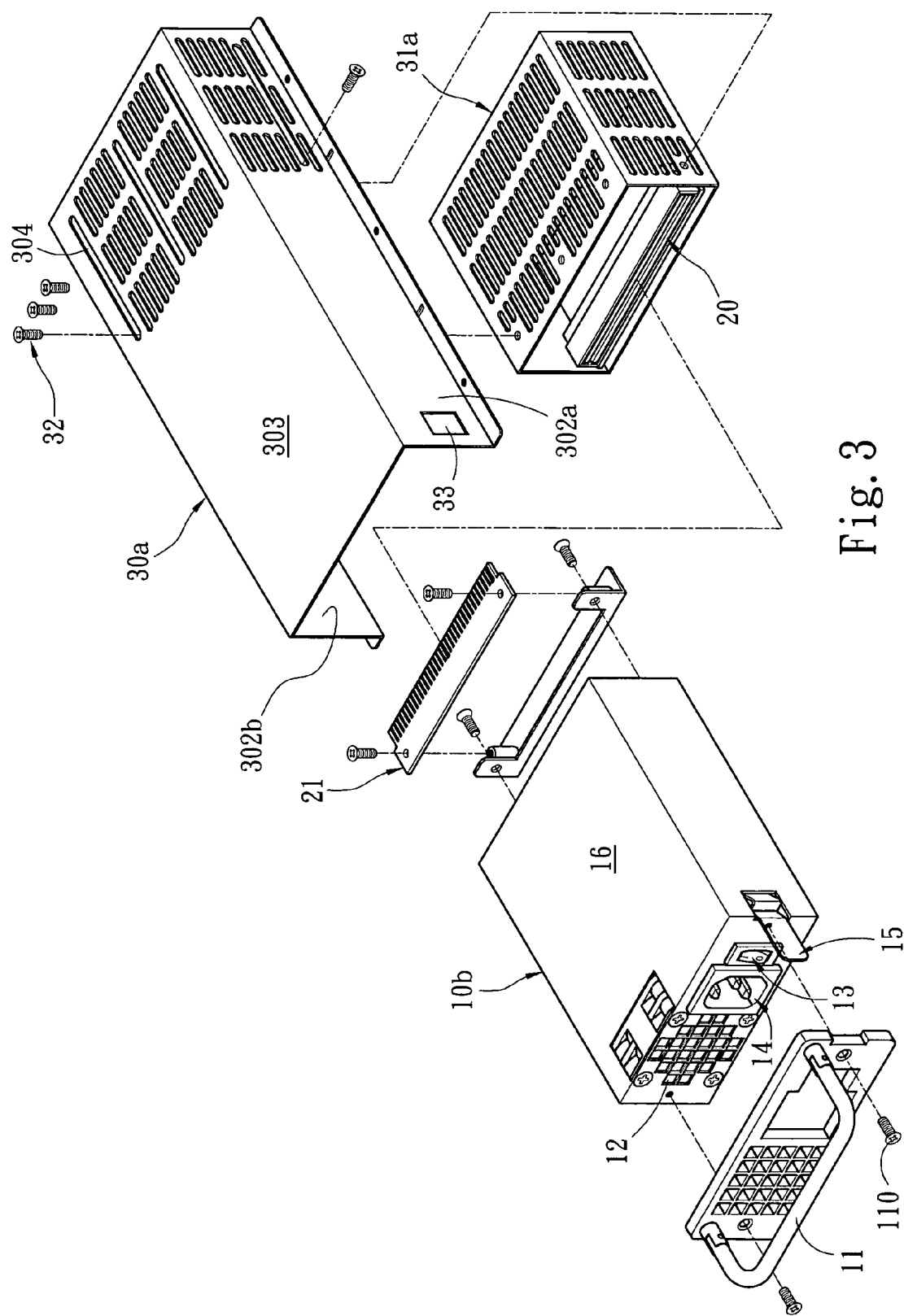
FIG. 3 is an exploded view of another embodiment of the present invention.
Figure 4A:
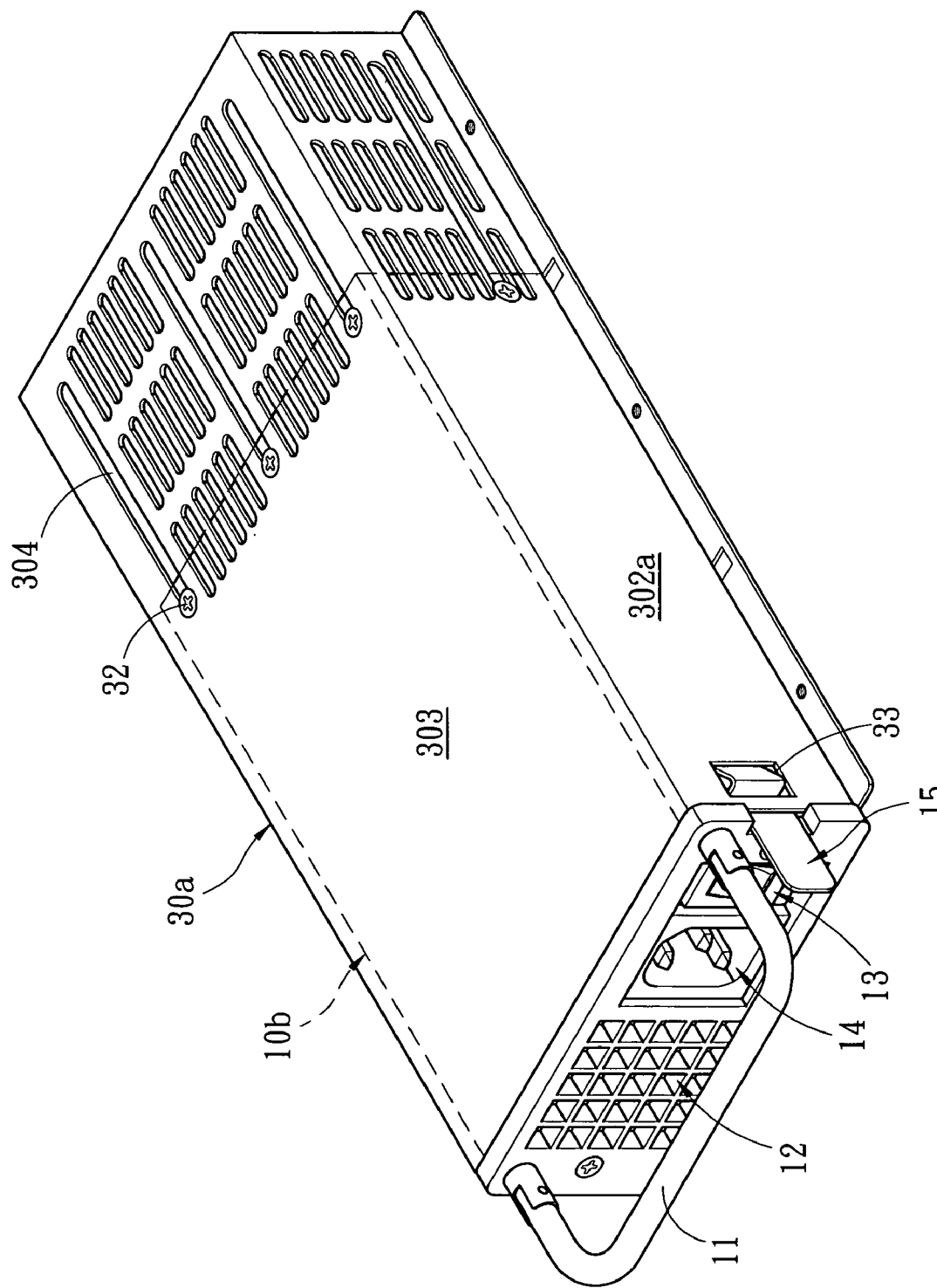
FIGS. 4A, 4B and 4C are schematic views of the present invention according to FIG. 3 in use conditions.
Figure 4B:
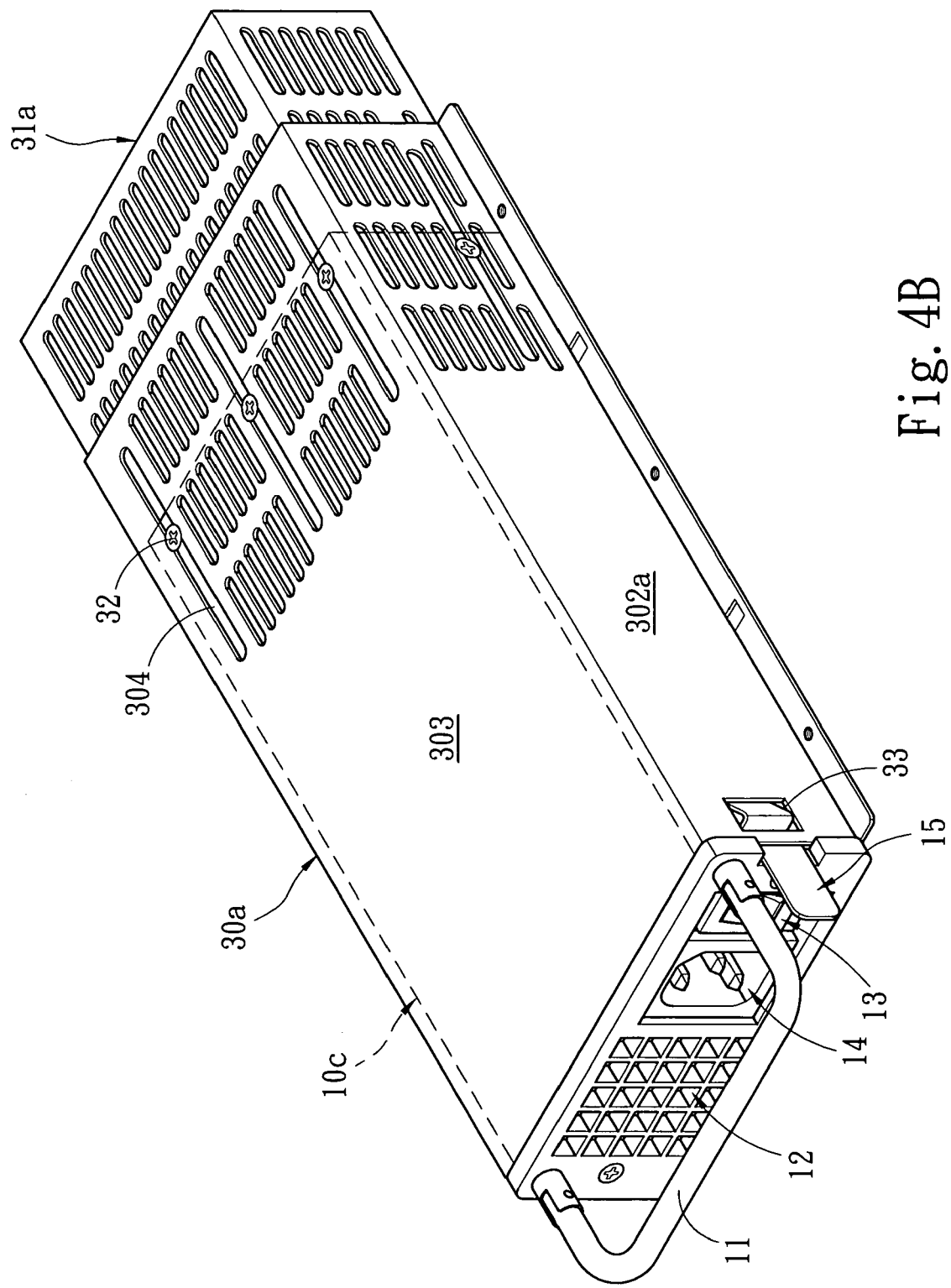
Figure 4C:
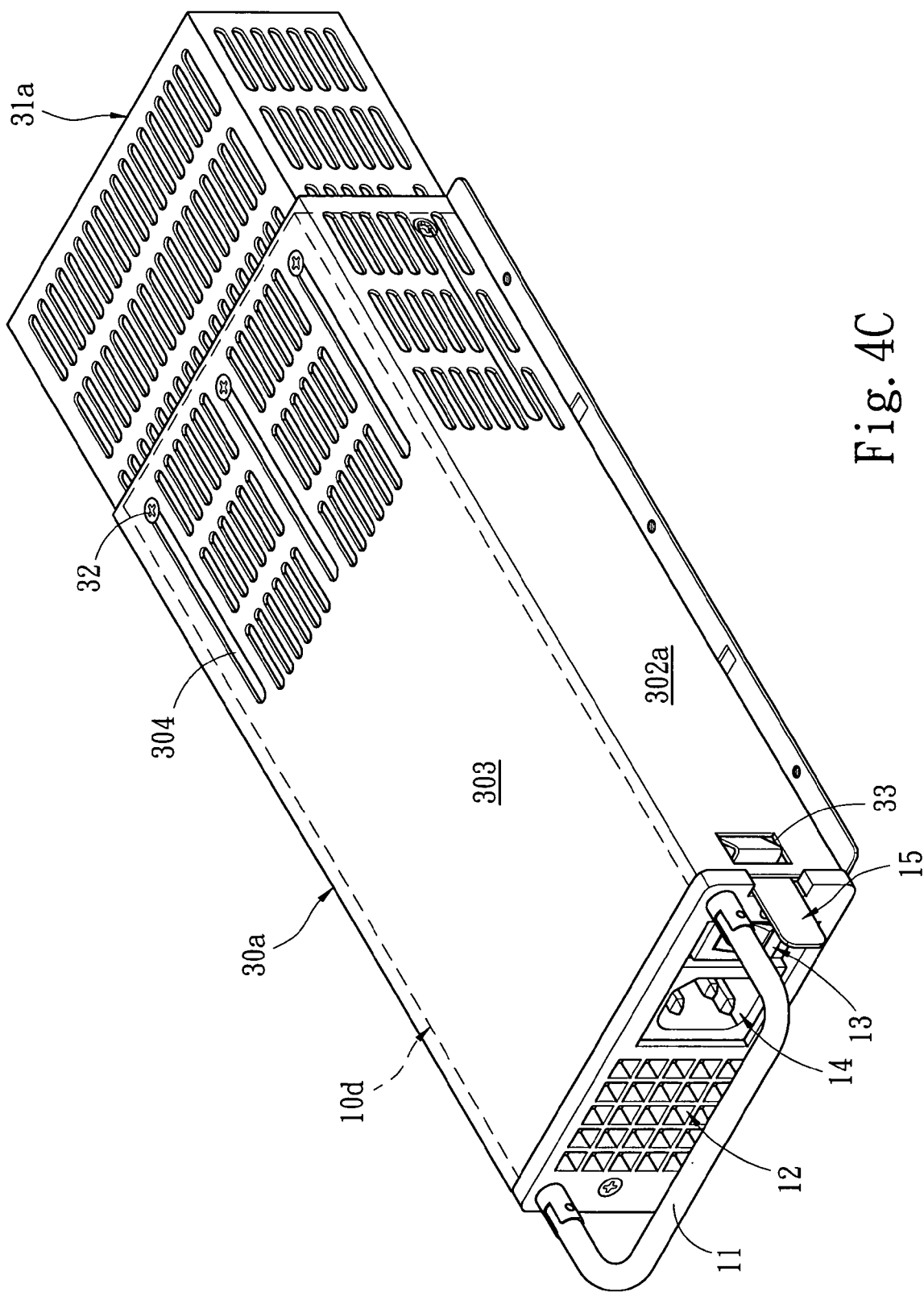

According to still another embodiment of the invention, the sliding board 31a of the holding unit is a hollow (as shown in FIG. 3) and houses the connection trough 20. The sliding board 31a thus formed can cover the connection trough 20 and the connection plug 21 there are coupled together to guard against hitting resulting from external forces or objects. The anchor deck 30a has two side walls 302a and 302b and a top surface 303, and has a plurality of vanes, and at least one slot 304 formed in a direction coinciding with the loading and unloading direction of the removable power supply 10b. The sliding board 31a is coupled with the anchor deck 30a through the slot 304 via fastening elements (such as screws 32), and is movable along the slot 304. Hence for replacing the removable power supply 10c of a different size and specification (such as a larger one shown in FIG. 4B), unfasten the screws 32; move the sliding board 31a and the connection trough 20 to a desired location mating the size of the removable power supply 10c; fasten the screws 32 again. Then the position of the connection trough 20 relative to the computer chassis can be altered easily. The anchor deck 30a is fastened to the computer chassis in advance. Mount the removable power supply 10b onto the anchor deck 30a, engage the latch member 15 with a latch hole 33 formed on the side wall 302a, the removable power supply 10b can be installed on the computer chassis. Referring to FIGS. 4A, 4B and 4C, by means of the design previously discussed, three removable power supplies 10b, 10c and 10d of different dimensions can be fully mounted onto the anchor deck 30a (the anchor deck 30a is fastened to the computer chassis).

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A loading and unloading mechanism for removable power supply modules to aid installation of a removable power supply on a computer comprising an electric connector and a holding unit;
    wherein the electric connector includes a connection trough which is coupled with a power supply circuit of the computer and a connection plug which is installed on one end of the removable power supply;
    wherein the holding unit includes an anchor deck fixedly mounted onto the computer and a sliding board movable on a surface of the anchor deck, the connection trough being mounted onto the sliding board such that the position of the sliding board and the connection trough relative to the anchor deck is alterable.

2. The loading and unloading mechanism of claim 1, wherein the anchor deck is a flat board and has a pair of parallel slots, the sliding board being coupled with the anchor deck through the slots via fastening elements and being movable along the slots.

3. The loading and unloading mechanism of claim 2, wherein the fastening elements are screws.

4. The loading and unloading mechanism of claim 1 further including a guarding cover to cover the connection trough and the connection plug that are coupled together.

5. The loading and unloading mechanism of claim 1, wherein the sliding board is hollow for fixedly housing the connection trough, the anchor deck having two side walls and a top surface and at least one slot formed in a direction coinciding with the loading and unloading direction of the removable power supply, the sliding board being coupled with the anchor deck through the slot via fastening elements and being movable along the slot.

6. The loading and unloading mechanism of claim 5, wherein the sliding board covers the connection trough and the connection plug that are coupled together.

7. The loading and unloading mechanism of claim 5, wherein the fastening elements are screws.

8. The loading and unloading mechanism of claim 1, wherein the power supply circuit includes circuits to provide power supply for a motherboard, hard disks, an optical disk drive and a floppy disk drive and other related peripheral devices.

* * * * *